US012664819B2

(12) United States Patent (10) Patent No.: US 12,664,819 B2
Li et al. (45) Date of Patent: Jun. 23, 2026

(54) JOINT EXPRESSION CODING SYSTEM AND METHOD BASED ON STATIC AND DYNAMIC EXPRESSION IMAGES

(71) Applicant: BEIJING UNIVERSITY OF TECHNOLOGY, Beijing City (CN)

(72) Inventors: Mi Li, Beijing City (CN); Yanbo Chen, Beijing City (CN); Jianhui Chen, Beijing City (CN); Shengfu Lv, Beijing City (CN)

( * ) Notice: Subject to any disclaimer, the term of this patent is extended or adjusted under 35 U.S.C. 154(b) by 259 days.

(21) Appl. No.: 18/528,827

(22) Filed: Dec. 5, 2023

(65) Prior Publication Data

US 2024/0212389 A1 Jun. 27, 2024

(30) Foreign Application Priority Data

Dec. 27, 2022 (CN) .......................... 202211687009.5

(51) Int. Cl.
*G06V 40/16* (2022.01)
(52) U.S. Cl.
CPC .................................. *G06V 40/176* (2022.01)
(58) Field of Classification Search
CPC .................................................... G06V 40/176
See application file for complete search history.

(56) References Cited

U.S. PATENT DOCUMENTS

2023/0298382 A1* 9/2023 Liu .................... G06V 10/7715
382/118

FOREIGN PATENT DOCUMENTS

| CN | 110427867 A | * 11/2019 | ........... G06F 18/214 |
| CN | 114220154 A | 3/2022 | |
| WO | WO2022111236 A1 | 2/2022 | |

OTHER PUBLICATIONS

Title: Facial Expression Recognition Based on the Fusion of Spatio-temporal Features in Video Sequences Authors: Wang Xiaohua; Xia Chen; Hu Min; Ren Fuji, (2018).

* cited by examiner

*Primary Examiner* — Tracy Mangialaschi

(57) ABSTRACT

A joint expression coding system based on static and dynamic expression images is disclosed, including an image preprocessing module, a dynamic expression image generation module, a dynamic weight image generation module, and a joint expression coding image generation module. A joint expression coding method based on the joint expression coding system is also disclosed. A static expression image and a dynamic expression image are combined into one image according to the coding method by adopting the joint expression coding system and method based on the static and dynamic expression images, whereby static expression information and dynamic expression information can be represented at the same time, thus improving the emotion recognition capability based on facial expressions.

2 Claims, 4 Drawing Sheets

Perform image preprocessing on an input expression video image

Generate a dynamic expression image according to a preprocessed expression video Generate a dynamic weight image according to the dynamic expression image Generate a joint expression coding image according to the dynamic weight image and a static image

JOINT EXPRESSION CODING SYSTEM AND METHOD BASED ON STATIC AND DYNAMIC EXPRESSION IMAGES

TECHNICAL FIELD

The present invention relates to the technical field of image processing, and more particularly, to a joint expression coding system and method based on static and dynamic expression images.

BACKGROUND ART

In interpersonal communication, facial expressions, as non-verbal signals, play an important role in emotional expression. Expressions are divided into a static expression and a dynamic expression. The static expression refers to expression information represented by each frame of image in an expression video, while the dynamic expression refers to change information between two adjacent frames.

At present, in the research of emotion recognition based on facial images and deep learning, information fusion and 3D convolution methods of static and dynamic facial images (convolution of facial appearance and time sequence at the same time) have achieved good performance. However, static and dynamic features are extracted independently through respective channels, lacking the internal correlation between static and dynamic information, thus affecting the representation capability of facial features. Although 3D convolution can extract space and time information at the same time, the video is divided into a plurality of sub-videos because of large computational complexity and low efficiency, which makes convolution unable to extract the dynamic features well and affects the emotion recognition performance.

SUMMARY

An object of the present invention is to solve the problems in the Background Art section. A static expression image and a dynamic expression image are combined into one image according to a coding method, whereby static expression information and dynamic expression information can be represented at the same time, thus improving emotion recognition capability based on facial expressions.

In order to achieve the above object, the present invention provides a joint expression coding system based on static and dynamic expression images, including an image pre-processing module, a dynamic expression image generation module, a dynamic weight image generation module, and a joint expression coding image generation module.

The image preprocessing module is connected to an expression video input end and is configured to perform image preprocessing on an input expression video.

The dynamic expression image generation module is connected to the image preprocessing module and is configured to generate a dynamic expression image from the preprocessed image.

The dynamic weight image generation module is connected to the dynamic expression image generation module and is configured to generate a dynamic weight image according to the dynamic expression image.

The joint expression coding image generation module is connected to the dynamic weight image generation module and is configured to generate a joint expression coding image according to the dynamic weight image and a static image.

A joint expression coding method based on the above system includes the following specific steps:

step S1: performing image preprocessing on an input expression video image;

step S2: generating a dynamic expression image according to a preprocessed expression video;

step S3: generating a dynamic weight image according to the dynamic expression image; and step S4: generating a joint expression coding image according to the dynamic weight image and a static image.

Preferably, the image preprocessing includes downsampling, image cropping, and image alignment.

Preferably, calculating and generating the dynamic expression image according to two adjacent frames of images includes the following specific sub-steps:

step S21: calculating a motion vector based on the following formula:

$$u = \operatorname{argmin}_{u'} \sum_x [I_{t+1}(x + u') - P(x)]^2$$

where $P(x)$ is a regional block of an image $I_t$ at time t, and the sum of squares of a difference between $P(x)$ and a corresponding regional block in an image $I_{t+1}$ at time t+1 is minimized at a center point $x=(x, y)$ to obtain a motion vector $u=(u, v)$, $u$, $v$ representing a motion direction and a motion velocity, namely an optical flow estimation of the regional block between two images, and $u'$ being a first derivative of the motion vector;

step S22: calculating a dynamic image based on the following formula:

$$I_d = \frac{1}{\sum_i Z_i} \sum_i^{N_s} (Z_i \cdot u_i)$$

where $I_d$ is an optical flow field between two adjacent frames of images $I_{t+1}$ and $I_t$ at time t and t+1, namely the dynamic image, $N_s$ is the number of regional blocks in the image, and $u_i$ is an optical flow estimation of a motion vector of a corresponding $i^{th}$ regional block in two adjacent frames of images.

$$Z_i = \lambda_i / \max (1, \|d_i(x)\|_2)$$
$$d_i(x) = I_{t+1}(x + u_i) - P(x)$$

where $\lambda_i$ is an indicator variable, which equals 1 only when the corresponding regional blocks in two adjacent images overlap.

Preferably, generating the dynamic weight image according to the dynamic expression image includes the following specific sub-steps:

step S31: normalizing the dynamic expression image based on the following formula:

$$I_{d'} = \frac{I_d}{255};$$

and step S32: calculating and generating a weight image $I_{d''}$ according to the normalized dynamic image $I_{d'}$ based on the following formula:

$$I_{d''} = w(x) = \frac{1}{1 + e^{-x}} * I_{d'}.$$

Preferably, step S4 includes the following specific sub-steps:

calculating each pixel value of the static image $I_s$ according to the weight image $I_{d''}$ to obtain a joint expression coding image based on the following formula:

$$I_c = I_{d''} \otimes I_s$$

where $I_c$ is the joint expression coding image, and $\otimes$ represents element multiplication.

Therefore, the present invention has the following beneficial effects: static and dynamic expressions are jointly coded to generate a jointly coded expression image including the static and dynamic expressions, and static information and dynamic information of the expressions are represented simultaneously by using the same space, thus improving the emotion recognition capability.

The technical solutions of the present invention will be described in further detail below through the accompanying drawings and the embodiments.

DETAILED DESCRIPTION OF THE EMBODIMENTS

Embodiments

Figure 1:
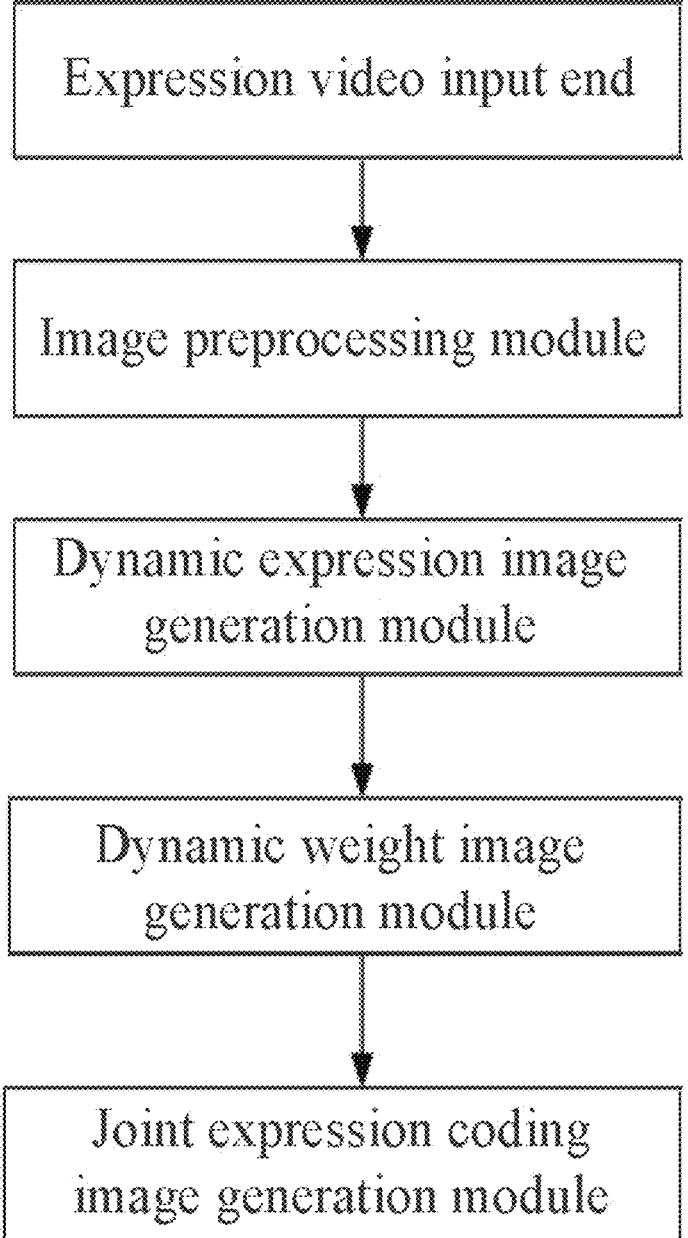
FIG. 1 is a schematic structural diagram of a joint expression coding system based on static and dynamic expression images according to the present invention.
Figure 2:
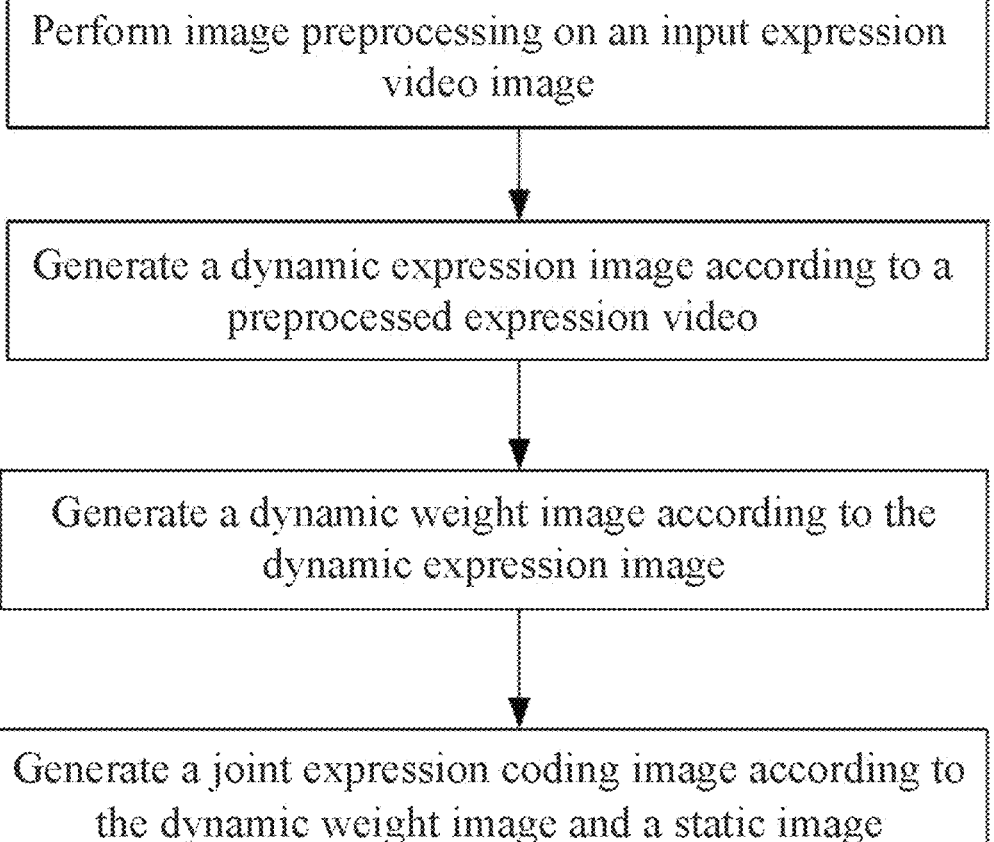
FIG. 2 is a flowchart of a joint expression coding method according to the present invention.

In order to make the objects, technical solutions, and advantages of the embodiments of the present invention clearer, the technical solutions of the embodiments of the present invention will be clearly and completely described below in conjunction with the accompanying drawings in the embodiments of the present invention. It is apparent that the described embodiments are part of, but not all of, the embodiments of the present invention. Therefore, the following detailed description of the embodiments of the present invention provided in the accompanying drawings is not intended to limit the scope of the claimed invention, but is merely representative of selected embodiments of the present invention. Based on the embodiments in the present invention, all other embodiments obtained by those of ordinary skill in the art without making creative efforts are within the scope of protection of the present invention.

In the description of the present invention, it is also to be noted that the terms "arranged", "mounted", and "connected" are understood broadly unless otherwise expressly specified and limited. For example, connected may be fixedly connected, detachably connected or integrally connected, may be mechanically connected or electrically connected, may be directly connected or indirectly connected through an intermediate medium, and may be internally communicated between two elements. The particular meaning of the above terms in the present invention may be understood in particular to those of ordinary skill in the art.

Some implementations of the present invention are described in detail below with reference to the accompanying drawings.

A joint expression coding system based on static and dynamic expression images includes an image preprocessing module, a dynamic expression image generation module, a dynamic weight image generation module, and a joint expression coding image generation module.

The image preprocessing module is connected to an expression video input end and is configured to perform image preprocessing on an input expression video. The dynamic expression image generation module is connected to the image preprocessing module and is configured to generate a dynamic expression image from the preprocessed image. The dynamic weight image generation module is connected to the dynamic expression image generation module and is configured to generate a dynamic weight image according to the dynamic expression image. The joint expression coding image generation module is connected to the dynamic weight image generation module and is configured to generate a joint expression coding image according to the dynamic weight image and a static image.

A joint expression coding method based on the above system includes the following specific steps:

Step S1: Perform image preprocessing on an input expression video image, the image preprocessing including downsampling, image cropping, and image alignment.

Step S2: Generate a dynamic expression image according to a preprocessed expression video.

The operation of calculating and generating the dynamic expression image according to two adjacent frames of images includes the following specific sub-steps:

Step S21: Calculate a motion vector based on the following formula:

$$u = \mathrm{argmin}_{u'} \sum_x [I_{t+1}(x + u') - P(x)]^2$$

where P(x) is a regional block of an image $I_t$ at time t, and the sum of squares of a difference between P(x) and a corresponding regional block in an image $I_{t+1}$ at time t+1 is minimized at a center point x=(x, y) to obtain a motion vector u=(u, v), u, v representing a motion direction and a motion velocity, namely an optical flow estimation of the regional block between two images, and u' being a first derivative of the motion vector.

Step S22: Calculate a dynamic image based on the following formula:

$$I_d = \frac{1}{\sum_i Z_i} \sum_i^{N_s} (Z_i \cdot u_i)$$

where $I_d$ is an optical flow field between two adjacent frames of images $I_{t+1}$ and $I_t$ at time t and t+1, namely the dynamic image, $N_s$ is the number of regional blocks in the image, and $u_i$ is an optical flow estimation of a motion vector of a corresponding $i^{th}$ regional block in two adjacent frames of images.

$$Z_i = \lambda_i/\max(1, \|d_i(x)\|_2)$$

$$d_i(x) = I_{t+1}(x + u_i) - P(x)$$

where $\lambda_i$ is an indicator variable, which equals 1 only when the corresponding regional blocks in two adjacent images overlap.

Step S3: Generate a dynamic weight image according to the dynamic expression image.

The operation of generating the dynamic weight image according to the dynamic expression image includes the following specific sub-steps:

Step S31: Normalize the dynamic expression image based on the following formula:

$$I_{d'} = \frac{I_d}{255};$$

Step S32: Calculate and generate a weight image $I_{d''}$ according to the normalized dynamic image $I_{d'}$ based on the following formula:

$$I_{d''} = w(x) = \frac{1}{1 + e^{-x}} * I_{d'}.$$

Step S4: Generate a joint expression coding image according to the dynamic weight image and a static image.

Each pixel value of the static image $I_s$ is calculated according to the weight image $I_{d''}$ to obtain a joint expression coding image based on the following formula:

$$I_c = I_{d''} \otimes I_s$$

where $I_c$ is the joint expression coding image, and $\otimes$ represents element multiplication.

Embodiment 1

This embodiment is used for expression recognition.

An expression recognition dataset uses open dynamic expression datasets CK+ and Oulu-CASIA for expression recognition respectively.

CK+Dataset includes 593 expression sequences of 123 subjects. The 327 expression sequences therein are provided with emotion labels, indicating 7 emotions: anger, contempt, disgust, fear, happiness, sadness, and surprise. All the expression image sequences gradually experience a transition from neutral expressions to peak expressions.

Oulu-CASIA Dataset includes 480 expression sequences of 80 subjects aged 23-58, including 6 emotions: anger, disgust, fear, happiness, sadness, and surprise. The expression image sequences start with neutral emotions and end with peak expressions.

Figure 3:
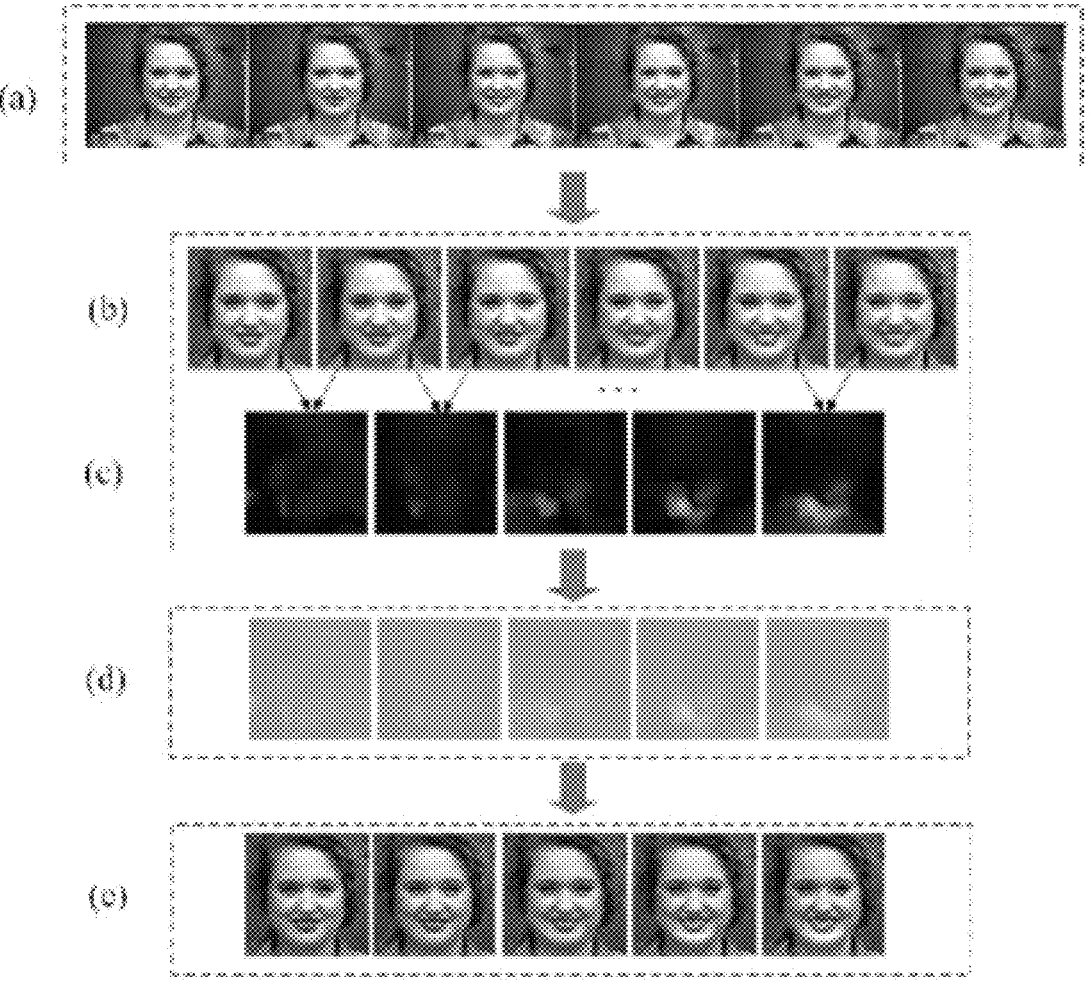
FIG. 3 is a flowchart of data processing according to Embodiment 1 of the present invention.

FIG. 3 is a flowchart of data processing according to Embodiment 1 of the present invention. As shown in FIG. 3, in the open expression dataset, each frame of expression image contains interference factors such as background, as shown in line (a) of FIG. 3. Therefore, firstly, an expression image is cropped and aligned with face to obtain a preprocessed expression image, as shown in line (b) of FIG. 3. Secondly, a dynamic expression image is calculated and generated according to two adjacent frames of images, as shown in line (c) in FIG. 3. Then, the dynamic expression image is normalized and a dynamic expression weight image is calculated and generated, as shown in line (d) in FIG. 3. Finally, a joint coding expression image is calculated according to the dynamic expression weight image and a static image, as shown in line (e) in FIG. 3.

Table 1 shows classification results of different methods using deep learning methods on CK+ and Oulu-CASIA datasets.

TABLE 1

| Comparison of emotion recognition capability based on different expression images (accuracy ± standard deviation) % | | |
| --- | --- | --- |
| Method | CK+ dataset | Oulu-CASIA dataset |
| Static expression image | 70.18 ± 2.77 | 66.98 ± 6.59 |
| Dynamic expression image | 56.60 ± 2.41 | 38.79 ± 2.43 |
| Static and dynamic expression images | 72.44 ± 2.27 | 69.21 ± 6.37 |
| 3D coding | 71.72 ± 2.75 | 67.48 ± 5.24 |
| Joint coding expression image | 75.80 ± 2.19 | 71.30 ± 7.53 |

It can be seen that the classification accuracy based on the joint coding expression image is significantly higher than that based on static expressions, dynamic expressions, fusion of static and dynamic expressions, and 3D coding methods.

Embodiment 2

This embodiment is used for depression expression recognition. A depression recognition dataset uses an emotional facial expression video dataset (eFEV) for depression recognition. The eFEV includes 86 depression patients and 44 normal people. When collecting data, subjects are required to watch happy and sad video clips (each video lasted for 90 s), and facial expressions of the subjects are collected synchronously with cameras. The cameras record the changes of facial expressions of the subjects when watching videos at a resolution of 1280*960 and a sampling frequency of 80 frames per second. Finally, each subject is recorded with a total of 14,400 facial expression images.

Figure 4:
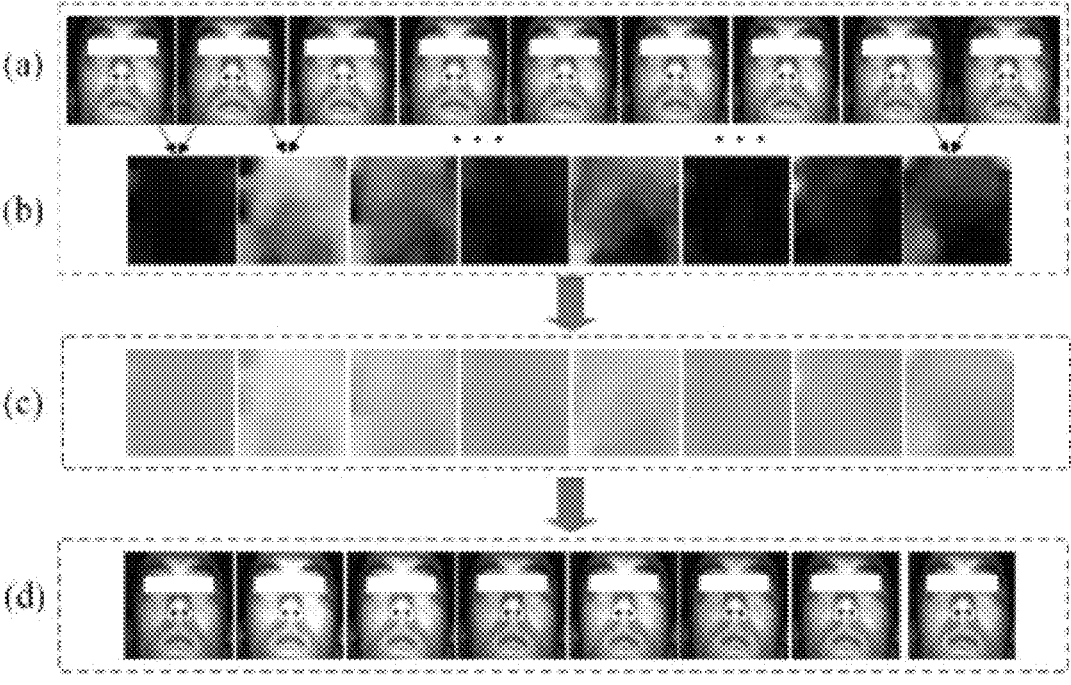
FIG. 4 is a flowchart of data processing according to Embodiment 2 of the present invention.

FIG. 4 is a flowchart of data processing according to Embodiment 2 of the present invention. As shown in FIG. 4, each video has 14,400 frames of images in an eFEV expression dataset. Since the expression changes of two adjacent frames of images are very small, the dataset is downsampled and one frame of image is extracted every 10 frames. In this way, 1,440 facial expression images may be obtained from each video.

Each frame of expression image contains interference factors such as background. Therefore, firstly, an expression image is cropped and aligned with face to obtain a preprocessed expression image, as shown in line (a) of FIG. 4. Secondly, a dynamic expression image is calculated and generated according to two adjacent frames of images, as shown in line (b) in FIG. 4. Then, the dynamic expression image is normalized and a dynamic expression weight image is calculated and generated, as shown in line (c) in FIG. 4.

Finally, a joint coding expression image is calculated according to the dynamic expression weight image and a static image, as shown in line (d) in FIG. 4.

Table 2 shows classification results of different methods using deep learning methods on an eFEV dataset.

TABLE 2

Comparison of depression recognition capability based on different expression images (accuracy + standard deviation) %

| Method | Sensitivity | Specificity | Precision | f1 score |
|---|---|---|---|---|
| Static expression image | 77.73 ± 1.10 | 74.60 ± 2.01 | 85.25 ± 0.97 | 81.31 ± 0.77 |
| Dynamic expression image | 42.05 ± 1.01 | 62.03 ± 0.64 | 67.65 ± 0.34 | 51.86 ± 0.84 |
| Static and dynamic expression images | 74.70 ± 2.08 | 81.84 ± 2.33 | 88.61 ± 1.28 | 81.04 ± 1.41 |
| 3D coding | 81.33 ± 1.89 | 69.38 ± 2.78 | 83.40 ± 1.27 | 82.33 ± 1.25 |
| Joint coding expression image | 85.44 ± 0.30 | 81.80 ± 0.57 | 81.71 ± 0.31 | 89.42 ± 0.12 |

It can be seen that the classification performance based on the joint coding expression image is significantly higher than that based on static expressions, dynamic expressions, fusion of static and dynamic expressions, and 3D coding methods.

Finally, it is to be noted that the above embodiments are intended only to illustrate and not to limit the technical solutions of the present invention. Although the present invention has been described in detail with reference to the preferred embodiments, it will be appreciated by those of ordinary skill in the art that modifications or equivalents may be made to the technical solutions of the present invention and that such modifications or equivalents do not depart the modified technical solutions from the spirit and scope of the technical solutions of the present invention.

What is claimed is:

1. A joint expression coding method based on static and dynamic expression images, comprising following specific steps S1 to S4:

step S1: collecting expression video images of a person by a camera, performing image preprocessing on the expression video images to obtain a preprocessed expression video, the image preprocessing comprising downsampling, image cropping, and image alignment;

step S2: generating a dynamic expression image according to the preprocessed expression video, wherein calculating and generating the dynamic expression image according to two adjacent frames of images comprises following specific sub-steps S21 to S22:

step S21: calculating a motion vector based on following formula:

$$u = \text{argmin}_{u'} \sum_x [I_{t+1}(x + u') - P(x)]^2$$

wherein P(x) is a regional block of an image $I_t$ at time t, and a sum of squares of a difference between P(x) and a corresponding regional block in an image $I_{t+1}$ at time t+1 is minimized at a center point x=(x,y) to obtain a motion vector u=(u,v), u, v representing a motion direction and a motion velocity, namely an optical flow estimation of the regional block between two images, and u' being a first derivative of the motion vector;

step S22: calculating the dynamic expression image based on following formula:

$$I_d = \frac{1}{\sum_i Z_i} \sum_i^{N_s} (Z_i \cdot u_i)$$

wherein $I_d$ is an optical flow field between two adjacent frames of images $I_{t+1}$ and $I_t$ at time t and t+1, namely the dynamic expression image, $N_s$ is a number of regional blocks in an image, and $u_i$ is an optical flow estimation of a motion vector of a corresponding $i^{th}$ regional block in two adjacent frames of images;

$$Z_i = \lambda_i / \max(1, \|d_i(x)\|_2)$$

$$d_i(x) = I_{t+1}(x + u_i) - P(x)$$

wherein $\lambda_i$ is an indicator variable, which equals 1 only when corresponding regional blocks in two adjacent images overlap;

step S3: generating a dynamic weight image according to the dynamic expression image based on following specific sub-steps S31 to S32:

step S31: normalizing the dynamic expression image based on following formula:

$$I_{d'} = \frac{I_d}{255};$$

and step S32: calculating and generating the dynamic weight image $I_{d''}$ according to the normalized dynamic expression image $I_{d'}$ based on following formula:

$$I_{d''} = w(x) = \frac{1}{1 + e^{-x}} * I_{d'};$$

step S4: generating a joint expression coding image according to the dynamic weight image and a static image, and calculating each pixel value of the static image $I_s$ according to the dynamic weight image $I_{d''}$ to obtain the joint expression coding image based on following formula:

$$I_c = I_{d''} \otimes I_s$$

wherein $I_c$ is the joint expression coding image, and $\otimes$ represents element multiplication;

and performing an emotion recognition on the person according to the joint expression coding image.

2. A joint expression coding system adopting the joint expression coding method based on static and dynamic expression images according to claim 1, comprising an image preprocessing module, a dynamic expression image generation module, a dynamic weight image generation module, and a joint expression coding image generation module, wherein the image preprocessing module is connected to an expression video input end and is configured to perform image preprocessing on input expression video images of a person collected by a camera to obtain a preprocessed image;

the dynamic expression image generation module is connected to the image preprocessing module and is configured to generate a dynamic expression image from the preprocessed image;

the dynamic weight image generation module is connected to the dynamic expression image generation module and is configured to generate a dynamic weight image according to the dynamic expression image; and the joint expression coding image generation module is connected to the dynamic weight image generation module and is configured to generate a joint expression coding image according to the dynamic weight image and a static image;

and an emotion recognition is performed on the person according to the joint expression coding image.

* * * * *